United States Patent [19]

Schmedding et al.

[11] 3,876,233

[45] Apr. 8, 1975

[54] TOOLLESS AUTOMATIC PIPE-COUPLING DEVICE

[75] Inventors: George Robert Schmedding, Harrisburg; William Franklin Broske, Camp Hill, both of Pa.

[73] Assignee: AMP Incorporated, Harrisburg, Pa.

[22] Filed: May 31, 1973

[21] Appl. No.: 365,808

[52] U.S. Cl............... 285/4; 24/421; 24/525; 285/18; 285/370
[51] Int. Cl.............................................. F16l 35/00
[58] Field of Search............ 285/370, 18, 371, 382, 285/421, 4; 29/421, 421 E, 464, 525, 516

[56] References Cited
UNITED STATES PATENTS

| 3,341,650 | 9/1967 | Broske | 403/274 X |
| 3,494,639 | 2/1970 | Smith | 285/370 X |
| 3,742,582 | 7/1973 | Broske | 285/370 X |
| 3,759,551 | 9/1973 | Broske | 285/382.2 X |
| R26,685 | 10/1969 | Broske | 29/421 E |

Primary Examiner—Dave W. Arola
Attorney, Agent, or Firm—Allan B. Osborne, Esq.

[57] ABSTRACT

The present invention relates to a self-contained, pipe-coupling device. More particularly, the invention includes a tapered tubular member and wedges which are driven into wedging engagement between the pipes being joined and the tubular member. The driving force is a quick burning propellant such as pistol powder.

3 Claims, 4 Drawing Figures

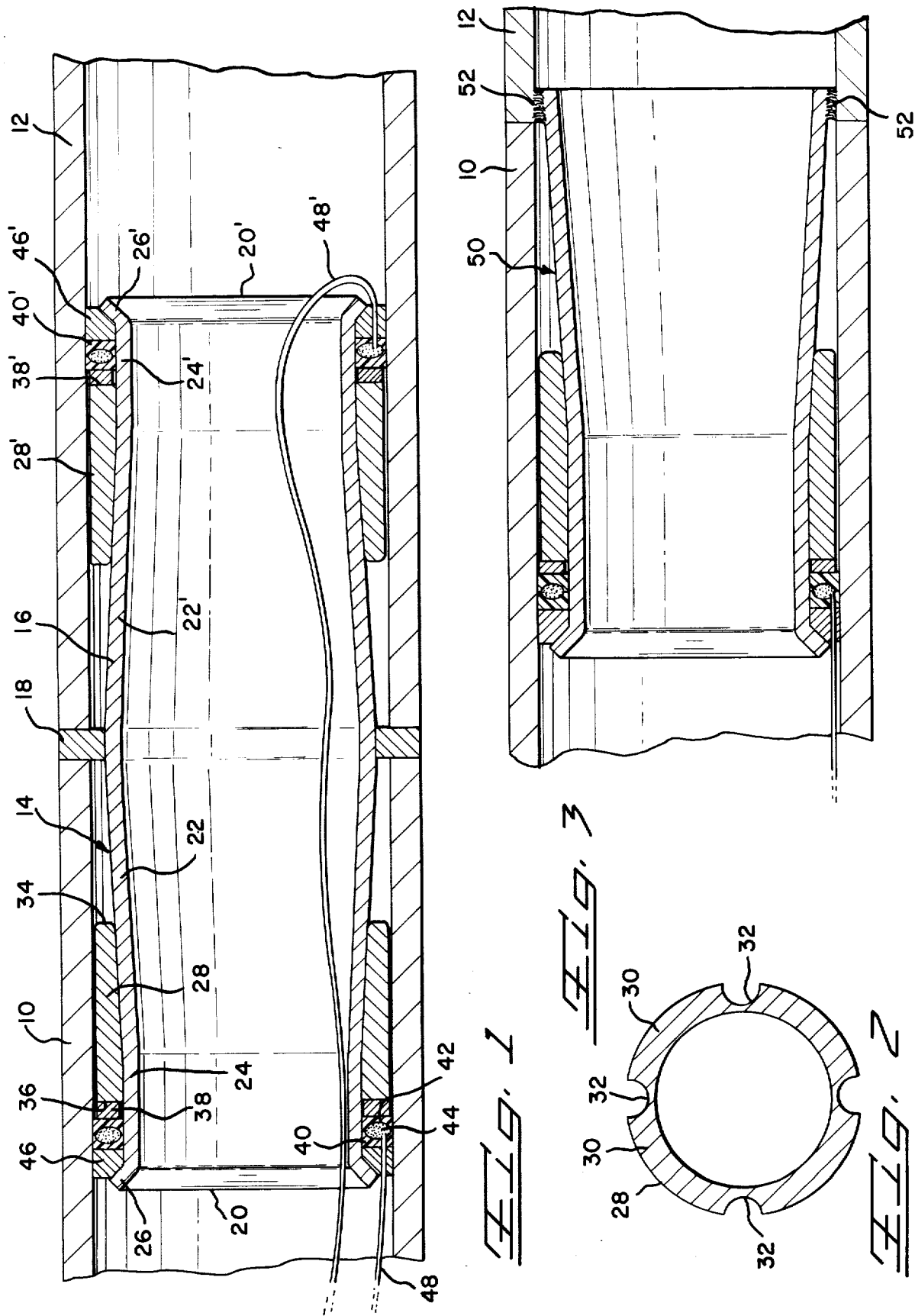

TOOLLESS AUTOMATIC PIPE-COUPLING DEVICE

BACKGROUND OF THE INVENTION

Joints of pipe are now being coupled principally by welding. Also, they are being joined by bolting together flanges welded on the ends. In any event, the present methods of coupling joints of pipe are costly, time-consuming and require skilled workmen.

Workers in the field have developed devices and methods to reduce the cost of and time required to join or couple pipe together. One such device is disclosed in U.S. Pat. Ser. No. 183,908, such disclosure incorporated herein by reference. Such device however incorporates a complex piston assembly for driving wedge members into frictional engagement between a tubular member and the conduit of pipe being joined.

It is therefore an object of this invention to provide a device which can be simply inserted into the adjacent ends of the pipe to be coupled, ingnite a propellant contained within the device and complete the job of coupling in a fraction of the time it takes to prepare the pipe for welding let alone the actual welding process itself.

BRIEF DESCRIPTION OF THE DRAWINGS

FIG. 1 is a cross-sectional view of the preferred embodiment of the present invention positioned within the ends of two joints of pipe to be coupled or joined by such invention;

FIG. 2 is an end view of the annular wedge member forming a part of the invention of FIG. 1;

FIG. 3 is a modified embodiment of the invention of FIG. 1; and

DESCRIPTION OF THE INVENTION

Figure 4:
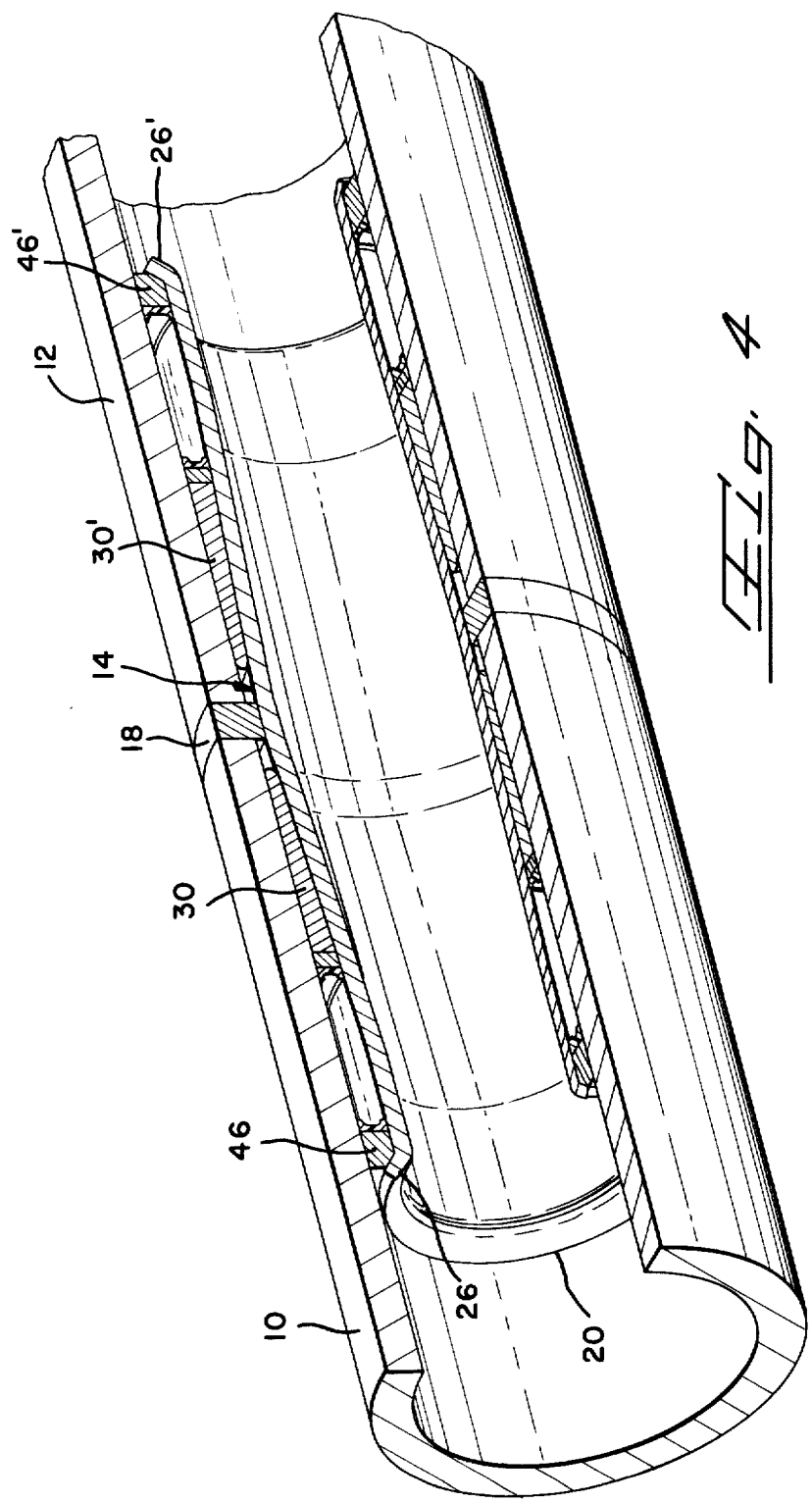
FIG. 4 is a perspective, partially sectional view of the invention of FIG. 1 after it has joined the pipes together.

In FIG. 1 the reference numerals 10 and 12 refer to two joints of pipe which are to be joined or coupled together by means of the present invention. Pipe 10-12 may be any rigid pipe made from steel, aluminum or the like. The present invention is a toolless coupling device, generally indicated by reference numeral 14, which requires no tools in its application.

The toolless coupling device 14 consists of an elongated tubular member 16 having a radially projecting collar 18 positioned thereon at the midpoint. Although the collar may be dimensionally sized to fit around tubular member 16 in an interference fit as shown in FIGS. 1 and 2, other means of attaching it may be used, e.g., by welding.

Collar 18 bisects tubular member 16 into two halfs, identical in length, dimensions and in geometry. This being so, a reference numeral designating an element on one half will apply to the element's "twin" on the other half; to distinguish one twin from another, the reference number on the right hand half will have a "prime" mark.

Between collar 18 and the extreme end 20, tubular member 14 consists of three sections: tapered portion 22 which starts adjacent collar 18 and extends away an appreciable distance therefrom; a flat section 24 adjacent the tapered section and a flare section 26 at end 20.

In addition to the tubular member 16, the toolless coupling device includes an annular wedge member 28 which consists of four wedge segments 30 joined together by frangible webs 32. FIG. 2, an end view of a wedge member 28, shows the segments and webs. Whereas four segments 30 are shown and preferred in the present invention, a fewer or greater number may be used in lieu thereof. The outer surface of each segment 30 is substantially parallel to the longitudinal axis of the segment. However, the inner surface, from wedge segment nose 34 rearwardly, is tapered, the degree of tapering being substantially the same as the degree of tapering on tapered section 22. The tapering of the inner surface does not extend necessarily all the way back to the back end 36 of segment 30. The transition between nose 34 and the inner and outer surfaces of the segment is preferably rounded as shown in FIG. 1.

An annular ring member 38, preferably made from a material such as aluminum is positioned adjacent the back of wedge member 28.

Next to ring member 38 is a propellant-carrying and sealing member 40. Sealing member 40, preferably made from polyethylene, consists of two rings wherein each of the mating surfaces contain a groove such that a chamber 42 is formed when the two rings are joined together. Contained within chamber 42 is propellant 44. Any number of propellants may be used. Hercules "Bullseye" smokeless pistol powder being one.

An annular back up plate 46 is positioned between flare section 26 and sealing member 40.

Suitable detonating means 48 extend from propellant 44 through appropriate openings in sealing member 40 and plate 46 (not shown) and out of the pipe to a suitable firing device (not shown). Detonating means 48 may include any number of methods and means for detonating propellant 44, the preferable means being tungsten wires, connected to a heavier wire 48, within the propellant.

FIG. 3 illustrates a modified version of toolless coupling device 14, therein designated by reference numeral 50. As seen, modified device 50 is just one half of device 14. It differs in that it has no collar 18 and secondly, in its application, end portion 52 is welded or otherwise secured to the end of pipe 12.

USE AND UTILITY OF THE INVENTION

Tubular member 14 is first formed without flare section 26 so as to allow the positioning thereon of collar 18, wedge members 28-28', ring members 38-38' propellant-carrying sealing members 40-40', plates 46-46' and detonating means 48-48'. Once these elements are on tubular member 14, the ends thereof can be formed into flare sections 26-26'.

One half of coupling device 14, assembled as above described, is inserted into the end of pipe 12 and pipe 10 is drawn up over the other half until collar 18 is engaged on either side by the pipes as shown in FIG. 1. Detonating means 48-48' are fed out through the joint of pipe being added on; in this case pipe 10, and connected to a power supply (not shown). A current flows through detonating means 48-48' detonating propellant 44-44'. The expanding gases drive wedge members 28-28' up tapered surfaces 22-22' and into wedging relation between pipes 10-12 and tubular member 14. As the driving force is great, such wedging is permanent and pipes 10-12 are coupled together as seen in FIG. 4.

Wedge members 28-28' as they move into wedging relation, break up into segments 30 due to the increased diameter of tubular member 14 near collar 18. The breaking up of wedge members 28-28' is permitted by frangible webs 32.

Ring members 38-38' serve two functions during the firing step. First and primarily, the rings prevent gases from rushing through the grooves between wedge segments 30-30' (see FIG. 2); i.e., it prevents failure of the sealing members in the areas of the grooves. Secondly, the rings distribute the pressure from the burning propellants equally against the back ends 36-36' of each segments 30-30'.

As propellants 44-44' burn and expand, sealing members 40-40' are split apart and driven into sealing engagement with members 22-22' and pipe 10-12. Pressure loss is minimized or prevented in this manner.

The use of modified coupling device 50 is the same as described above except with the requirement of fastening an end thereof to an end of a pipe.

The dimensions of the tubular member 14 at its midsection is preferably slightly less than the inner diameter of the pipe being coupled. The length of each half of the tubular members 14 is preferably about two to three times the pipe's inner diameter and the degree of taper is about three degrees relative to the longitudinal axis of the device.

The length of wedge members 28-28' is about two-thirds the inner diameter of the pipe. Obviously the taper on the wedge segments should coincide with the taper on the tubular member.

The above dimensions are not limited per se. For example in one successful test using the modified coupling device 50, the pipes being coupled had a six inch outer diameter and five and one-half inch inner diameter. The tubular member was nine and one-half inches long and had a wall thickness of five-sixteenths inches. The wedge segments were three and one-half inches long. Thirty-five grains of Hercules Bullseye pistol powder was used. In another test where the dimensions were the same except that fifty grains of powder was used, everything performed as expected except that appreciable gas leaks were noted.

As with dimensions, different materials may be used. Preferably, however, all the elements may be made from aluminum except of course for the propellant and sealing member. In the above noted tests, annealed aluminum, grade 60-61-TO was used.

Although not shown it will be apparent that radical structural changes can be made to the present invention while still retaining the inventative concepts. For example, the coupling device can be made in reverse so that it could be placed on the outside of the pipes being joined. The tubular member would be tapered radially outwardly from the mid-point and the flare section would be projecting inwardly. The wedge members would require some modification to allow them to come together as they are driven inwardly toward the mid-point. Another modification not shown is to size one-half of the device to fit one diameter pipe and size the other half to fit another diameter pipe whereby pipe of different diameters may be coupled. Further, the device may be used to couple any type of tubular items together; e.g., electrical conduits.

Further, it will be apparent to those skilled in the art that the present invention and modifications thereto can be used to join or connect many different kinds of items together notwithstanding their structure in so far as such items have an opened end into which the coupling device can be placed. For example, the coupling device is ideally suitable for joining expansion joints to electrical conduits such as used in tubular bus bars and conduit-containing gas insulated transmission systems.

The foregoing detailed description has been given for clearness of understanding only, and no unnecessary limitations should be understood therefrom, as some modifications will be obvious to those skilled in the art.

What is claimed is:

1. A toolless pipe coupling device for coupling two pipes arranged end to end which comprises:
   a. an elongated tubular member having sections extending longitudinally from either side of the midpoint of the member, the walls of said sections being tapered inwardly towards the ends thereof and adapted to slidingly receive thereon the ends of pipe which may be coupled;
   b. a plurality of wedge segments slidably positioned around said tubular member in the vicinity of said tapered sections;
   c. charges of propellant positioned behind said wedge segments, and abutment means positioned behind said charges of propellant, said charges being contained within annular sealing members which, upon the charge being detonated, press against the wedge segments and abutment means and extend across the annular space between the tubular member and the pipe wall thereby providing a seal to prevent the gas from the detonated charge from blowing by the wedge segments and abutment means; and
   d. detonating means for detonating the propellant charges whereby the pressure developed therefrom drives said wedge segments longitudinally inwardly toward the midpoint whereby the wedge segments become wedged between and thereby frictionally couple the pipes and the tubular member together.

2. A toolless pipe coupling device for coupling two pipes arranged end to end which comprises:
   a. an elongated tubular member having tapered sections extending longitudinally in either direction from the midpoint of said member with the taper being toward the free ends, a radially outwardly projecting flared section at each end of said member and a flattened section between said tapered section and said flared sections, said tubular member adapted to be slid into the opened ends of pipe which may be coupled;
   b. a collar positioned around said tubular member at said midpoint thereof and against which said pipes abut when said tubular member slides into said opened ends;
   c. a pair of wedge members each consisting of a plurality of segments coupled together by frangible webs, said wedge members slidably positioned around said tubular member adjacent said tapered sections;
   d. a pair of ring members each positioned adjacent the back ends of said wedge members;
   e. a pair of annular sealing members each positioned around the flattened sections on said tubular member and adjacent said ring members, said sealing members containing therein a charge of propellant;
   f. a pair of back-up plates each positioned between said sealing member and said flared section on said tubular member, said plates in conjunction with said flared section adapted to contain the pressure developed from the detonating of said propellant and said annular sealing members, which upon the charge, being detonated, press against the ring members and back up plates and extend across the annular space between the tubular member and pipe wall thereby providing a seal to prevent the gas from the detonated charge from blowing by the back up plates and ring members; and g. detonating means for detonating said propellant charges whereby the pressure developed therefrom drives said edge members longitudinally inwardly toward said midpoint whereby said wedge segments become wedged between and thereby frictionally and cold-weldingly coupling said two pipes and said tubular member together; further, as the wedge segments are driven along the increasingly larger diameter of the tapered sections, the lateral space between wedge segments increase causing the frangible webs to rupture.

3. A toolless pipe coupling device for joining two items having tubular ends, which comprises:

a. an elongated tubular member having an end portion and a converging tapered section extending axially therefrom, said end portion adapted to be fastened to an end of one of said items and said tapered section adapted to be slid into an open end of another of said items;

b. a flared section at the end of the tapered section;

c. wedging means movably positioned around said tubular member and adapted to be moved along said tapered section thereon; and d. back-up means positioned between said flared section and said wedging means and abutment means positioned adjacent said flared section; sealing means positioned between said abutment means and said back-up means and a charge of propellant contained within said sealing means and said sealing means upon the charge being detonated, press against said back-up means and abutment means and extend across the annular space between the tubular member and inside wall of said another of said items thereby providing a seal to prevent the gas from the detonated charge from blowing by the back-up means and abutment means, and detonating means for detonating the propellant charge whereby the pressure developed propells said wedging means along said tapered section whereby said wedging means are wedged inbetween said tubular member and the inside wall of said another, of said items into which said tapered section is placed thereby frictionally joining said two items together.

* * * * *